J. E. GIBBONS.
LOCKING DEVICE FOR STEERING WHEELS.
APPLICATION FILED NOV. 24, 1913.
1,098,435.
Patented June 2, 1914.
2 SHEETS—SHEET 1.
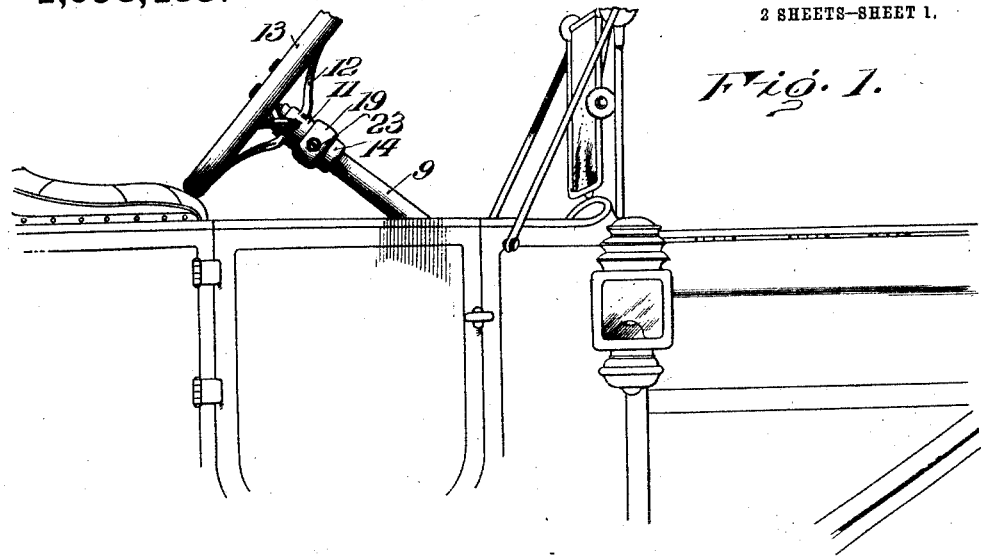
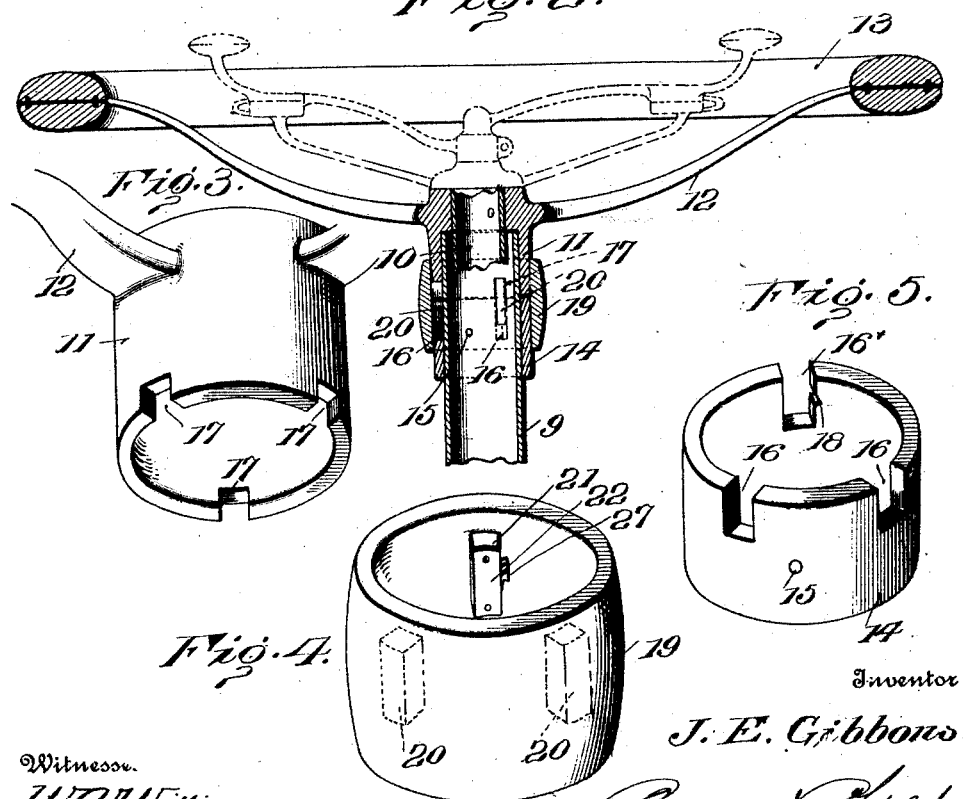
Witnesses
W. A. Williams
Dudley Browne
Inventor
J. E. Gibbons
By Rowe & Phelps
Attorneys J. E. GIBBONS.
LOCKING DEVICE FOR STEERING WHEELS.
APPLICATION FILED NOV. 24, 1913.
1,098,435.
Patented June 2, 1914.
2 SHEETS—SHEET 2.
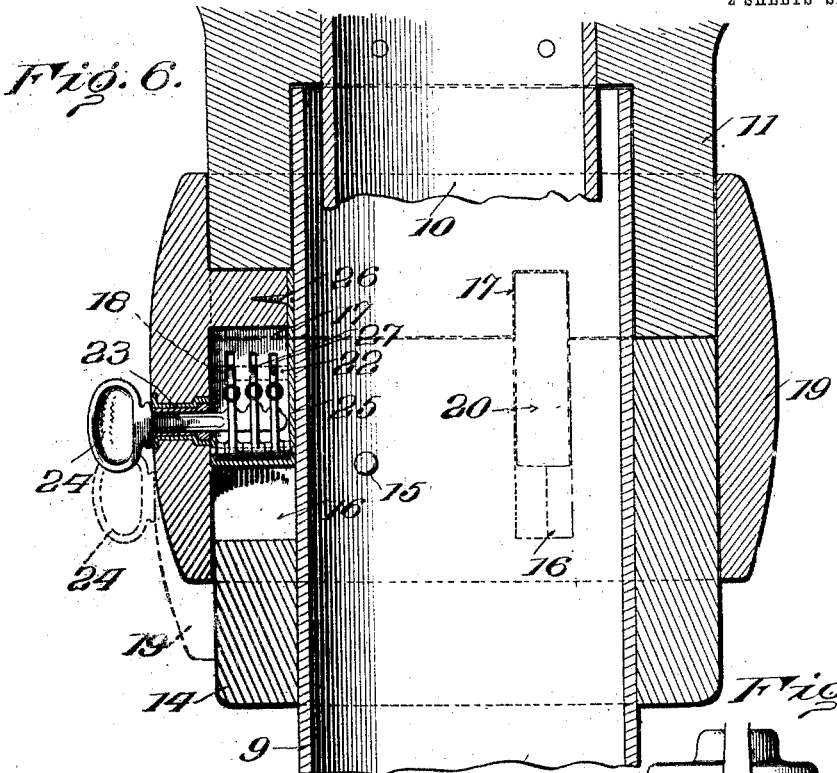
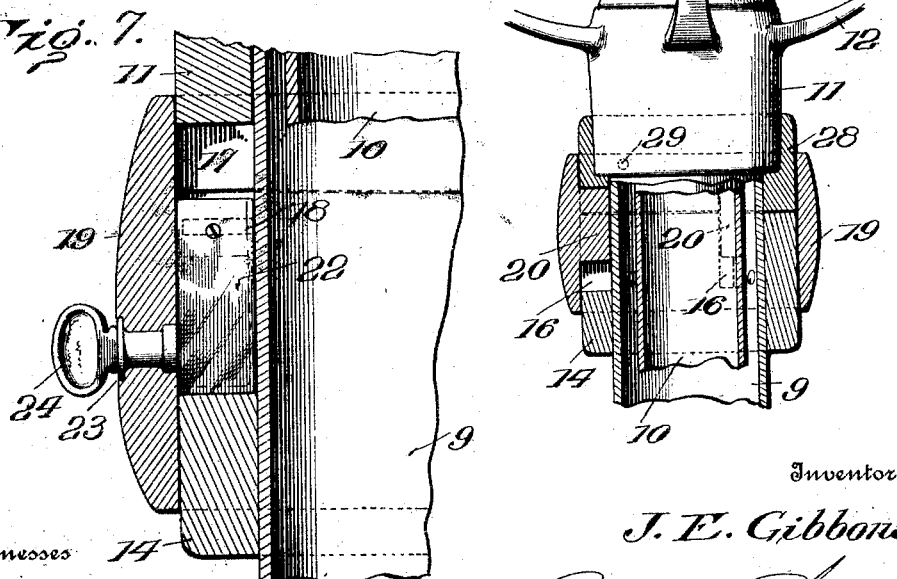
Inventor
J. E. Gibbons.
Witnesses
W. A. Williams
Dudley Brown
By Howard Phelps
Attorney

UNITED STATES PATENT OFFICE.

JOSEPH E. GIBBONS, OF WASHINGTON, DISTRICT OF COLUMBIA.

LOCKING DEVICE FOR STEERING-WHEELS.

1,098,435.  Specification of Letters Patent.  Patented June 2, 1914.

Application filed November 24, 1913. Serial No. 802,786.

*To all whom it may concern:*

Be it known that I, JOSEPH E. GIBBONS, a citizen of the United States, residing at Washington, District of Columbia, have invented certain new and useful Improvements in Locking Devices for Steering-Wheels, of which the following is a specification.

My invention relates to locking devices for automobiles to prevent the unauthorized operation of the same, and it relates more particularly to that class of such devices which are adapted to lock the steering shaft and its surrounding column together to thereby prevent the turning of the former by means of the steering wheel.

The primary object of my invention is the provision of a locking device which is adapted for application to the standard form of steering post or shaft to render unnecessary any material modification of said parts, as well as to render the device of easy application thereto.

A further object of my invention is the production of a locking device of the character referred to which is of comparatively few parts and simple in construction, and thereby comparatively inexpensive in cost of production, and one which will effectively perform the purpose for which it is designed.

In the accompanying drawings illustrating the preferred embodiment of my invention, and in which like numerals designate corresponding parts wherever they occur, Figure 1 is a side partly broken view of an automobile and its steering head and wheel and showing my improved locking device applied thereto; Fig. 2, a vertical section through the steering wheel and column; Fig. 3 a perspective partly broken view of the standard or usual form of the collar forming a hub or flange surrounding the upper portion of the steering column and from which the spokes of the steering wheel extend; Fig. 4 a perspective view of the sliding locking sleeve which holds the parts in locked position; Fig. 5 a perspective view of the member applied to the steering column below the head; Fig. 6 an enlarged detail section through the device in locked position; Fig. 7 a broken section of Fig. 6 showing the parts unlocked, and Fig. 8 a sectional view illustrating a modification of the invention.

The numeral 9 designates the casing for the steering rod. The part 9 will hereinafter be called the steering column. Located inside of the column 9 is the usual steering rod 10 provided at its upper extremity with a steering head 11, having the usual spokes 12 integral therewith, and supporting a wheel 13 of approved construction. The construction just described is common to the greater number of motor cars now in use and is adapted for use in conjunction with the preferred embodiment of my improved locking device.

In applying the locking device to the steering mechanism an annular member 14, shown in Fig. 5, is riveted to the upper end of the column 9 at 15, 15. At the upper edge of the member 14 are provided a plurality of vertical slots 16, 16, 16′, shown in the drawing as three in number, but which may be any desired number. Corresponding in location and number to the slots 16 a similar series of slots 17 are cut out of the steering post head 11. The slots 17 are not as long as the slots 16, but are identical in every other detail. Formed in one of the slots 16′ is a small notch 18 the purpose of which will be hereinafter described.

Shown in Fig. 4 is an annular member 19 of relatively large bore provided upon its interior circle with lugs 20, 20 and 21 of a size adapted to engage the slots 16 and 17. This member or sleeve 19 is placed over the annulus 14 with the lugs 20, 20, 21 in engagement with the slots 16, 16, 16′. Carried by the lug 21 is a lock 22 preferably of the Yale three-tumbler type comprising three spring pressed pivoted levers which are simultaneously operated and which form a bolt 27 hereinafter mentioned, and having a key hole 23 extending through the sleeve 19 for the insertion of a key 24 therein. The lock is held in place on the lug 21 by a plate 25 secured by a screw 26. The three levers form a more effective lock and are all operated at one time by the turning of the key.

The operation of the device is as follows: The sleeve 19 being in position with the lugs 20 engaging the slots 16 should it be desired to lock the steering wheel against unauthorized movement the sleeve 19 is slid upwardly until the lugs 20 engage also the slots 17 of the steering head 11, part of the lugs so remaining within the slots 16 due to the lesser length of the slots 17. While in this position the bolt 27 of the lock 22 will snap into the notch 18 in the slot 16' and prevent any further movement of the sleeve 19. The head 11 being on the steering rod and the member 14 on the column the lugs 20 will cause a lock between the slots of each member, thus preventing any rotary movement of the wheel 13. When it is desired to unlock the device the proper key 24 is inserted to operate the lock when the sleeve is slid down upon the member 14 until the lugs 20, 20, 21 are out of engagement with the slots 17 when the head is free to turn to steer the car. Should it be found desirable to attach my improved locking device to a steering mechanism in which the steering head 11 did not have the necessary length to accommodate its slots there is provided the modification shown in Fig. 8, which comprises an annular member 28 similar to the member 14 but with shorter slots. This member 28 is inverted and bolted or united at 29 to the head 11 where it performs the same function of the head 11 with the slots 17 as previously described.

A device constructed in accordance with my invention is simple, safe and inexpensive. It forms no projection upon the steering column to annoy the driver of the machine, or obstruct entry to or egress from the car.

While I have shown my invention as applied to the steering wheel of an automobile, yet it is obvious that it is equally applicable for use in connection with the steering wheels of boats or in other relations where steering devices are employed and in which the construction is that of a steering column surrounding a steering post and which parts it is desired to lock against unauthorized manipulation.

I realize that considerable variation of the specific details of my invention may be practised without departing from the spirit thereof, and it is not my intention to limit myself to the exact construction illustrated but to construe my invention as broadly as the state of the prior art will permit.

Having thus described my invention what I claim as new and desire to secure by Letters Patent is:

1. In a device of the character described, the combination with a column, of a steering post inclosed thereby, a steering head on said post and formed with a plurality of slots therein, an annular member secured to said column and provided with a plurality of corresponding slots, and adjustable means covering the joining line of said head and column and adapted to engage one or both of the said series of slots in its adjusted positions.

2. In a device of the character described, the combination with a column, of a steering post inclosed thereby, a steering head on said post and formed with a plurality of slots therein, an annular member secured to said column and provided with a plurality of corresponding slots, adjustable means covering the joining line of said head and column and adapted to engage one or both of the said series of slots in its adjusted positions, and means for locking said adjustable member in a position engaging both of said series of slots, whereby to lock said steering head and column together.

3. In a device of the character described the combination with a steering head, of an annular member secured thereto and provided with a plurality of vertical slots, a steering column, an annular member secured to said column and provided with a corresponding series of slots, and means slidably mounted outside of said annular member and adapted to releasably secure said parts together, whereby to lock the steering head against rotation.

4. In a device of the character described, the combination with a steering head provided with a plurality of slots, of a column adjacent said head, an annular member secured to said head and provided with an opposed series of slots, a sliding sleeve having a bore of relatively large diameter, a plurality of lugs extending into said bore, said lugs being adapted to engage one or both of the said series of slots in the adjusted positions of said sleeve, a lock carried by one of said lugs, means carried by one of said lugs to receive the bolt of said lock when said sleeve is in its position of engagement with both of said series of slots, the sleeve being also provided with an aperture for the insertion of a key to operate said bolt, the said sleeve being adapted when in raised position to engage both of the series of slots and the bolt to engage its receiving means to lock the parts against rotation, and when in lowered position to free the steering head and allow the rotation thereof.

5. In a device of the character described, a member having engaging means formed therein, a second member having corresponding engaging means formed therein, and adjustable means covering the joining line of said members and having engaging means adapted to engage one or both of the series of engaging means in each member in its adjusted positions.

In testimony whereof I affix my signature in presence of two witnesses.

JOSEPH E. GIBBONS.

Witnesses:
J. K. MOORE,
F. L. BROWNE.